(12) United States Patent
Watanabe et al.

(10) Patent No.: US 9,403,342 B2
(45) Date of Patent: Aug. 2, 2016

(54) CERMET COATING AND COATED METAL BODY HAVING THE CERMET COATING, METHOD OF PRODUCING CERMET COATING, AND METHOD OF PRODUCING COATED METAL BODY

(71) Applicant: National Institute for Materials Science, Tsukuba-shi, Ibaraki (JP)

(72) Inventors: Makoto Watanabe, Tsukuba (JP); Seiji Kuroda, Tsukuba (JP); Masayuki Komatsu, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 14/364,199

(22) PCT Filed: Mar. 12, 2013

(86) PCT No.: PCT/JP2013/056754
§ 371 (c)(1),
(2) Date: Jun. 10, 2014

(87) PCT Pub. No.: WO2013/137233
PCT Pub. Date: Sep. 19, 2013

(65) Prior Publication Data
US 2014/0370324 A1 Dec. 18, 2014

(30) Foreign Application Priority Data

Mar. 12, 2012 (JP) ................................. 2012-054561

(51) Int. Cl.
*C23C 24/04* (2006.01)
*B32B 15/01* (2006.01)
(Continued)

(52) U.S. Cl.
CPC . *B32B 15/01* (2013.01); *C09D 5/38* (2013.01); *C23C 24/04* (2013.01); *C23C 24/08* (2013.01); *C23C 30/00* (2013.01); *Y10T 428/12063* (2015.01)

(58) Field of Classification Search
USPC ........................... 428/325, 469, 472; 427/451
See application file for complete search history.

(56) References Cited

U.S. PATENT DOCUMENTS

| 6,482,534 | B2* | 11/2002 | Itsukaichi | ............... | C22C 1/051 428/402 |
| 6,641,917 | B2* | 11/2003 | Itsukaichi | ................. | C23C 4/06 428/404 |
| 8,066,795 | B2* | 11/2011 | Mizuno | .................... | C23C 4/06 427/451 |

FOREIGN PATENT DOCUMENTS

| CA | 1004964 A1 | 2/1977 |
| FR | 2186548 A1 | 1/1974 |

(Continued)

OTHER PUBLICATIONS

Kuroda et al "Microstructure and enhanced mechanical properties of Wc-Co coatings obtained by Warm Spraying" International Thermal Spray Conference (2010).*

(Continued)

*Primary Examiner* — Archene Turner
(74) *Attorney, Agent, or Firm* — Hoffmann & Baron, LLP

(57) ABSTRACT

A cermet coating includes a hard phase and a binder phase that binds the hard phase,
wherein the hard phase includes a carbide phase composed of at least one type of WC and CrC; and the binder phase includes at least one type of metal phase selected from Co, Ni, NiCr, and CoCr, has a structure of a metal polycrystalline body, and is bonded directly to a metal substrate.

7 Claims, 9 Drawing Sheets

(51) Int. Cl.
  *C23C 30/00* (2006.01)
  *C09D 5/38* (2006.01)
  *C23C 24/08* (2006.01)

(56) References Cited

FOREIGN PATENT DOCUMENTS

| GB | 1439947 A | | 6/1976 |
|---|---|---|---|
| GB | 2106144 A | | 4/1983 |
| JP | 10-110252 | * | 4/1998 |
| JP | 2008-069377 A | | 3/2008 |
| WO | WO 2011/065512 A1 | | 6/2011 |

OTHER PUBLICATIONS

Pornthep Chivavibul et al., "Effects of Particle Strength of Feedstock Powders on Properties of Warm-Sprayed WC-Co Coatings", Journal of Thermal Spray Technology, Springer US, Boston, vol. 20, No. 5, Feb. 3, 2011, pp. 1098-1109.

Seiji Kuroda et al., "Warm spraying-a novel coating process based on high-velocity impact of solid particles", Science and Technology of Advanced Materials, Sep. 10, 2008, pp. 033002-033017.
Office Action-1, Search Report, EP 13761633.0, Jul. 6, 2015.
Chivavibul et al., Effects of Carbide Size and Co Content on the Microstructure and Mechanical Properties of HVOF-Sprayed WC-Co Coatings, Surface & Coatings Technology, 202 (2007), p. 509-521.
Chivavibul et al., Evaluation of HVOF-Sprayed WC-Co Coatings for Wood Machining, Surface & Coatings Technology, 202 (2008), p. 5127-5135.
Chivavibul et al., Development of WC-Co Coatings Deposited by Warm Spray Process, Journal of Thermal Spray Technology, 17 (5-6), 2008, p. 750-756.
Chivavibul et al., Effect of Powder Characteristics on Properties of Warm-Sprayed WC-Co Coatings, Journal of Thermal Spray Technology, 19 (1-2), 2010, p. 81-88.
International Search Report, PCT/JP2013/056754, Apr. 23, 2013.
Mikell P. Groover, "Fundamentals of Modern Manufacturing" Fourth Edition, John Wiley & Sons, Inc., pp. 379-380 (Jan. 1, 2010).
European Office Action for corresponding European Application No. 13761633.0, pp. 1-5, May 20, 2016.

* cited by examiner

CERMET COATING AND COATED METAL BODY HAVING THE CERMET COATING, METHOD OF PRODUCING CERMET COATING, AND METHOD OF PRODUCING COATED METAL BODY

This application is the U.S. National Phase of, and Applicants claim priority from, International Patent Application Number PCT/JP2013/056754 filed 12 Mar. 2013, which claims priority from Japanese Patent Application No. 2012-054561 filed 12 Dec. 2012, each of which is incorporated herein by reference.

TECHNICAL FIELD

The present invention relates to a cermet coating having a novel structure and a method of producing the same, and more specifically, relates to a cermet coating in which hard particles containing a carbide and a metal binder phase that binds them are complexed, and a method of producing the coating. The present invention also relates to a coated metal body having such a coating and a method of producing the same.

Priority is claimed on Japanese Patent Application No. 2012-054561, filed Mar. 12, 2012, the content of which is incorporated herein by reference.

BACKGROUND ART

A cermet in which the particles of a hard compound phase such as a carbide and a nitride are bound by a metal phase has been used as a material for modifying the surface properties of substrates. A spraying method has been used conventionally for the formation of a cermet coating. In a spraying method (for example, a high velocity flame spraying process), the raw material powder is melted, and the melted particles are sprayed onto a substrate to be deposited on the substrate. However, for example, in the case of a WC—Co coating that uses tungsten carbide and cobalt as materials, the tungsten carbide-cobalt (WC—Co) coating prepared by a thermal spraying process forms, within the coating, not only a hard WC phase and a Co binder phase that have a composition of the raw powder, but also η phases such as $Co_3W_3C$ and $Co_6W_6C$, and a $W_2C$ phase, by the dissolution of the WC phase into the Co phase or the reaction of the WC phase with oxygen, at the time of the process. Further, since the melted particles are rapidly cooled on the substrate, the structure of the binder phase is a structure composed of amorphous materials. As a result, although cermet coatings such as the WC—Co coating formed by a conventional thermal spraying process have excellent hardness, the fracture toughness was low, and the occurrence of damages such as partial detachment and chipping has been a problem when an instantaneous load is applied locally (for example, Non-Patent Documents 1 and 2). Further, in the WC—Co coating containing such degradation phases at the time of the process (the η phase and $W_2C$ phase described above), since it contains a W—C—Co based material that is excluded from the region of the two-component system with WC and Co as the end components, it is impossible to return to a two-phase state of WC and Co even when the coating is subjected to a heat treatment.

On the other hand, by a new process called the warm spray process, it has become possible to allow the WC—Co raw powder, without melting, to collide with the substrate at a high speed while being in a solid phase, thereby suppressing the thermal degradation during the process (for example, Patent Documents 1 and 2, and Non-Patent Document 3). The coating obtained by this process is constituted by a WC phase and a Co phase that maintain the structure of the raw material powder, while the formation of a degradation phase is suppressed. However, although the fracture toughness of the coating obtained by the warm spray process is superior to that of the coatings obtained by a conventional high velocity flame spraying process, it has been far inferior, as compared with that of the sintered bulk body of WC—Co which is produced by a hot press or the like (Non-Patent Documents 3 and 4). The reason for this is that because the particles fly at a very high speed and collide with the substrate during the process, an extremely large plastic deformation occurs within a Co phase serving as a binder phase, and the crystal structure is disturbed and mostly becomes amorphous.

CITATION LIST

Patent Documents

[Patent Document 1] Japanese Unexamined Patent Application, First Publication No. 2008-069377
[Patent Document 2] PCT International Publication No. WO 2011/065512

Non-Patent Documents

[Non-Patent Document 1] P. Chivavibul, M. Watanabe, S. Kuroda, and K. Shinoda, Effects of carbide size and Co content on the microstructure and mechanical properties of HVOF-sprayed WC—Co coatings, Surf. Coat. Technol., 2007, 202 (3), p. 509-521.
[Non-Patent Document 2] P. Chivavibul, M. Watanabe, S. Kuroda, and M. Komatsu, Evaluation of HVOF-sprayed WC—Co coatings for wood machining, Surf. Coat. Technol., 2008, 202 (21), p. 5127-5135.
[Non-Patent Document 3] P. Chivavibul, M. Watanabe, S. Kuroda, J. Kawakita, M. Komatsu, K. Sato, and J. Kitamura, Development of WC—Co Coatings Deposited by Warm Spray Process, J. Therm. Spray Technol., 2008, 17 (5-6), p. 750-756.
[Non-Patent Document 4] P. Chivavibul, M. Watanabe, S. Kuroda, J. Kawakita, M. Komatsu, K. Sato, and J. Kitamura, Effect of Powder Characteristics on Properties of Warm-Sprayed WC—Co Coatings, J. Therm. Spray Technol., 2010, 19 (1), p. 81-88.

DISCLOSURE OF INVENTION

Technical Problem

In the cermet coatings such as WC—Co that have been produced by the conventional thermal spraying process or warm spray process, the metal binder phase has turned into amorphous. For this reason, in the case of coatings, it has not been possible to achieve a high fracture toughness, which is a feature of the sintered bulk body of a cermet.

In order to solve this problem, the present invention aims to provide a cermet coating in which hard carbide phases are bound by a crystalline metal phase, and a method of producing such a cermet coating. In addition, the present invention has an object of providing a coated metal body having such a cermet coating and a method of producing the same.

Solution to Problem

In the present invention, a heat treatment is carried out after the deposition of a cermet coating, and the heat treatment conditions in particular are devised to thereby achieve a cermet coating in which the metal binder phase is composed of a polycrystalline body.

The present invention relates to a coating having a thickness from 20 to 1,000 μm and bonded to a metal substrate which includes two phases composed of a carbide and a metal phase, and the metal phase is composed of a polycrystalline body.

A first aspect of the present invention is a cermet coating bonded directly to a metal substrate and having a hard phase and a binder phase that binds the hard phase, which is a cermet coating characterized in that the binder phase has a structure of a metal polycrystalline body. For example, the hard phase described above may include one or two types of carbides selected from WC and CrC, and the binder phase described above may include one or more types of metal phases selected from Co, Ni, NiCr, and CoCr. The thickness of the above coating may be, for example, from 20 to 1,000 μm.

A second aspect of the present invention is a cermet coating according to the aforementioned first aspect, which is a cermet coating (WC—Co coating) characterized in that the hard phase includes WC; the binder phase includes Co; ratios of WC and Co are from 75 to 92% by mass and from 25 to 8% by mass, respectively; a WC particle size is from 50 to 5,000 nm; and a Co phase is a polycrystalline body composed of crystals having a crystal grain size of 50 to 1,000 nm and a face-centered cubic lattice structure, a thin film having a thickness of 20 to 1,000 μm, and a porosity within the coating is not more than 1% by volume.

In the second aspect described above, the metal substrate is preferably a metal substrate that can be subjected to a heat treatment at a heat treatment temperature of 600 to 1,300° C. By forming a cermet coating according to the second aspect described above on such a metal substrate, it is possible to impart wear resistance to the metal substrate.

A third aspect of the present invention is a coated metal body having a metal base and a coating formed on at least a portion of the surface of the metal base, which is a coated metal body wherein the coating includes the cermet coating according to Claim 1 or Claim 2, and the cermet coating is bonded directly to at least a portion of the surface of the metal base.

A fourth aspect of the present invention is a method of producing a cermet coating, which is a method of producing a cermet coating including a step of forming, on a metal substrate, a precursor coating containing a carbide phase and an amorphous binder phase composed of a metal phase by causing composite particles of the carbide phase and the metal phase to be accelerated to a rate of 500 m/s or higher by a gas stream and also to be heated to a temperature equal to or below the melting point, using a warm spray process, to be collided with a metal substrate in a continuous manner; and a step of recrystallizing the metal phase into a polycrystalline body by heat treating the precursor coating in an inert atmosphere composed of at least one type of argon and helium. The carbide phase may include one or two types selected from WC and CrC, and the metal phase may include at least one type selected from Co, Ni, NiCr, and CoCr. By using this method, it is possible to produce a cermet coating according to the first aspect described above.

A fifth aspect of the present invention is a method of producing a cermet coating according to the fourth aspect described above, which is a method of producing a cermet coating characterized in that the carbide phase includes WC; the metal phase includes Co; the composite particles are WC—Co particles having a composition within a range so that a ratio of WC is from 75 to 92% by mass and a ratio of Co is from 25 to 8% by mass, and having a particle diameter of 1 to 100 μm; and in the heat treatment step, the precursor coating is held for 5 minutes or more at a temperature range from 600 to 1,300° C., and is then cooled to 300° C. or less at a cooling rate of 3° C./min or more, to thereby form a cermet coating composed of WC—Co having a polycrystalline body of Co crystals with a face-centered cubic structure as a binder phase. According to this method, it is possible to produce a cermet coating according to the second aspect described above.

A sixth aspect of the present invention is a method of producing a coated metal body, which is a method of producing a coated metal body characterized by including a step of forming a cermet coating bonded directly to at least a portion of a surface of a metal base using the metal base as a metal substrate by a method according to the fourth or fifth aspect described above.

Advantageous Effects of Invention

Since the binder phase is a polycrystalline body, the cermet coating according to the present invention has an excellent fracture toughness as a coating and excellent ductility can be expected, as compared with the conventional cermet coating in which the binder phase is in an amorphous state. As a result, an excellent wear resistance can be developed. The coated metal body in which such a cermet coating is formed exhibits improvements in the characteristics such as wear resistance and corrosion resistance, and has an excellent durability.

BEST MODE FOR CARRYING OUT THE INVENTION

Figure 1:
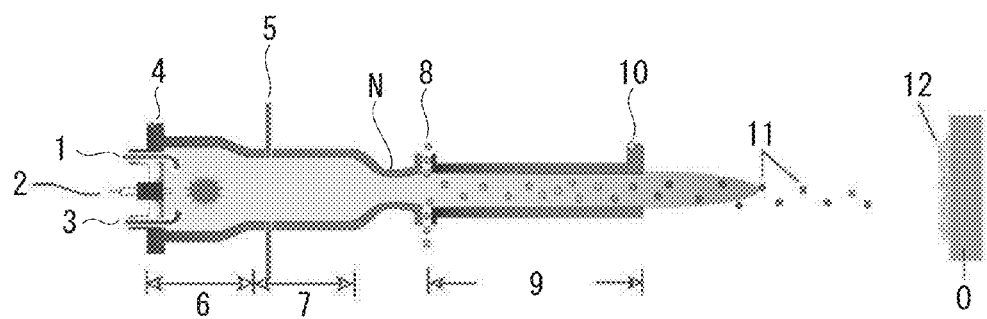
FIG. 1 is a schematic diagram showing a warm spray apparatus and a deposition method using the same.

The cermet coating of the present invention includes a hard phase (a hard particle phase and a dispersed phase) and a binder phase, and the binder phase includes a structure of a metal polycrystalline body. The cermet coating is bonded directly to a metal substrate. The hard phase may include a carbide phase, and may be made substantially of a carbide phase. As the carbide phase, one or two types selected from WC and CrC can be used. As the binder phase, one that contains at least one type of metal selected from Co, Ni, a nickel-chromium binary alloy (hereinafter, described as "NiCr"), and a cobalt-chromium binary alloy (hereinafter, described as "CoCr") can be used. The polycrystalline body that constitutes the above binder phase may have a face-centered cubic structure. Examples of the combinations of hard phase and binder phase include WC—Co, WC—Ni, WC—CoCr, WC—NiCr, and CrC—NiCr. The combinations of hard phase and binder phase can be selected in accordance with the surface properties of the substrate, such as wear resistance and corrosion resistance, where improvements are expected.

The coated metal body of the present invention is one in which the above cermet coating is provided on at least a portion of the surface of a metal base.

A method of producing the above cermet coating includes a step of producing a precursor coating including the carbide phase and the binder phase composed of the metal phase (deposition step) by causing composite particles of the carbide phase and the metal phase (cermet particles) to be accelerated to a rate of 500 m/s or higher by a high speed gas stream and also to be heated to a temperature not greater than the melting point so as to continuously collide with a metal substrate, using a warm spray process; and a heat treatment step in which the coating is subjected to a heat treatment in an inert atmosphere composed of at least one type of argon and helium. In a stage following the deposition by the warm spray process, the binder phase of the coating is substantially formed of an amorphous phase, although the amorphous phase is recrystallized by the heat treatment step to form a binder phase composed of a polycrystalline body. In the process of this recrystallization, it is possible to reduce the abundance ratio of pores in the coating. It is preferable to set so that the pores in the coating in terms of volume density is not more than 1%.

The heating temperature of the composite particles by the warm spray process is equal to or less than the melting point and is preferably a temperature lower than the melting point. In other words, it is equal to or less than the liquidus temperature corresponding to the quantitative ratio of carbide and binder phase, and is preferably less than the liquidus temperature. The heating temperature of the particles is equal to or lower than the eutectic temperature of the system, and is preferably lower than the eutectic temperature. In the warm spray process, the gas stream used for heating the composite particles may be a stream of mixed gas of a combustion gas of a fuel and an inert gas.

In the conventional high velocity flame spraying process, the combustion gas formed by combusting a fuel is ejected from a nozzle, thereby generating a high temperature and high speed gas stream. At this time, by mixing a raw material in the combustion gas, the raw material particles are heated, accelerated, and caused to collide onto a substrate, thereby depositing the particles on the substrate. On the other hand, in the warm spray process, after adjusting the temperature by mixing an inert gas with the combustion gas formed by combusting a fuel, the mixed gas of the combustion gas and the inert gas is ejected from the nozzle to generate a high speed gas stream. At this time, a raw material is mixed with the mixed gas, and the raw material particles are heated, accelerated, and caused to collide onto a substrate, thereby depositing the particles on the substrate. As the fuel, for example, one selected from a raw material gas such as propylene, acetylene, and hydrogen, kerosene, or the like can be used. As the inert gas, a nitrogen gas can be used. In addition, a rare gas such as helium or argon may also be used.

The heating temperature of the composite particles by the warm spray process is equal to or less than the melting point of the composite particles used, and is preferably a temperature lower than the melting point. In other words, it is equal to or less than the liquidus temperature corresponding to the quantitative ratio of carbide and metal, and is preferably lower than the liquidus temperature. It should be noted that when there is a eutectic temperature in the carbide-metal system used, it is equal to or less than the eutectic temperature, and is preferably lower than the eutectic temperature. On the other hand, because the metal particles are softened by heating, the heating temperature is, for example, preferably equal to or greater than 787° C.

In the coating which is in a state of being formed using the warm spray process (in this case, described as a precursor coating), the metal binder phase is substantially in a state of amorphous phase. In the present invention, by subjecting the coating following the deposition to a heat treatment in an inert atmosphere, the amorphous phase is recrystallized to thereby form a cermet coating in which the binder phase is composed of a polycrystalline body. Note that the heat treatment is usually carried out on the precursor coating and the metal substrate.

The heat treatment is carried out in an inert atmosphere containing at least one type of argon and helium in order to prevent oxidation of the metal phase. In the heat treatment, the coating is heated to a predetermined temperature for a predetermined time, and is then cooled. The conditions such as the temperature, time and cooling rate during this process are selected in accordance with the metal phase (binder phase) to be used and the crystal structure of the desired metal. For example, the heat treatment conditions can be selected so that the metal binder phase becomes a polycrystalline body composed of metal crystals having a face-centered cubic structure.

For example, in the case of using Co as the binder phase, as will be explained in the WC—Co coating described later, by setting the heating temperature to 600° C. or greater and adjusting the cooling rate, it is possible to impart a face-centered cubic structure to the Co crystals of the binder phase. When the binder phase is Ni, because the face-centered cubic structure of Ni is stable at both room temperature and high temperatures, a temperature to cause recrystallization, for example, a temperature of 600° C. or higher may be used. When the binder phase is an alloy, the heating temperature for making the crystals to have a face-centered cubic structure is adjusted in accordance with the alloy composition. When the binder phase is NiCr (nickel-chromium binary alloy), if the Cr solid solution amount is equal to or less than 30% by mass, the heating temperature at the time of heat treatment may be 600° C. or greater. On the other hand, if the Cr solid solution amount is within the range exceeding 30% by mass and equal to or less than 40% by mass, the holding temperature at the time of heat treatment is preferably 1,000° C. or greater. When the binder phase is CoCr (Co—Cr binary alloy), if the Cr solid solution amount is about 40% by mass, the heating temperature at the time of heat treatment is preferably 800° C. or greater. When the Cr solid solution amount is not more than 33.9%, the heating temperature at the time of heat treatment is preferably 1,000° C. or greater.

The heating temperature in the above heat treatment is carried out at a temperature equal to or greater than the lower limit of the temperature at which recrystallization of the metal phase occurs. On the other hand, the heating temperature is preferably less than the temperature at which the solid solution reaction between the carbide (hard phase) and the metal binder phase occurs.

The holding time of the heat treatment is preferably at least 5 minutes and more preferably 2 hours or longer at a predetermined temperature. A certain amount of time is required for the disturbed atomic arrangement to be restored which is in an amorphous state when deposited. Especially in the low temperature side where the activity is low, the longer the holding time, the more stable the crystal structure becomes, and the uniformity of the structure is enhanced.

According to the above method, a cermet coating bonded directly to the metal substrate can be obtained. In addition, by forming the cermet coating of the present invention on at least a portion of the surface of the metal base, using the metal base having a predetermined shape as a substrate, the coated metal body of the present invention can be produced.

The metal constituting the above metal substrate (metal base) is not particularly limited. For example, various carbon steels, special steels, stainless steel materials and alloys can be used. More specifically, a 12% Cr steel, a 13% Cr steel, a 16% Cr 4% Ni steel, a Ti-6Al-4V alloy (JIS TAB6400, ASTM B348 Gr5), a 1% Cr—MoNiV steel, a 2% Cr—MoNiWV steel or the like can be used. As specific examples of steel materials, various carbon steels as prescribed in JIS, stainless steels (SUS 304, 304L, 316, 316L or the like), AISI 304, 304L, 316, 316L or the like as prescribed in AISI, and X5CrNi18-10, X2CrNi19-11, X5CrNiMo17-12-2, X2CrNiMo17-14-3 or the like as prescribed in DIN can be used. Further, the high-speed tool steels and alloy tool steels, for example, SK140, SK120, SK105, SK95, SK85, SK75, SK65, SKH2, SKH 3, SKH 4, SKH 10, SKS11, SKS 2, SKS21, SKS 5, SKS51, SKS 7, SKS 8, SKS 4, SKS41, SKS43, SKS44 SKS 3, SKS31, SKS93, SKS94, SKS95, SKD 1, SKD11, SKD12, SKD 4, SKD 5, SKD 6, SKD61, and SKD62 as prescribed in JIS, W1-111/2, W1-10, W1-9, W1-8, T1, T4, T5, T15, M2, M3-1, M3-2, M4, M36, M7, M42, F2, L6, W2-91/2, W2-8, D3, D2, A2, H21, H11, H13, and H12 as prescribed in ASTM, C105W1, C 80W1, C 80W1, C 70W2, S18-1-2-5, S12-1-4-5, S 6-5-2, S 6-5-3, S 6-5-2-5, S10-4-3-10, S 2-10-1-8, 105WCr6, 105WCr6, X210Cr12, X38CrMoV51, X40CrMoV51, X32CrMoV33, and 55NiCr-MoV6 as prescribed in DIN, or the like may be used.

The metal base that constitutes the main body of the coated metal body of the present invention can be constituted by the metal selected from the above metals and the like depending on the application. The shape of the metal base is not particularly limited. For example, it can be selected from various forms such as the working tools including a drill, an end mill, and a cutting chip, various roll members including a rolling roll, a guide roll, a papermaking roll, a film roll, a calendar roll, and a plywood roll, and structure steels including steam turbine blade materials, rotor materials, and steel materials for bridges.

As an embodiment of the cermet coating and the production method thereof according to the present invention, a WC—Co coating and the method of producing the same will be described below.

The WC—Co coating of the present embodiment is composed of 75 to 92% by mass of WC and 25 to 8% by mass of Co. In other words, the above WC—Co coating is composed of 75 to 92% by mass of WC, with the balance being substantially Co. However, it should be noted that unavoidable impurities may be included apart from WC and Co. In the above coating, WC particles having a particle diameter of 50 to 5,000 nm are bound by a Co phase. The Co phase is a polycrystalline body composed of crystals having a crystal grain size of 50 to 1,000 nm and a face-centered cubic lattice structure. The coating thickness is preferably from 20 to 1,000 μm. The porosity within the coating is preferably not greater than 1% by volume. The above coating can be made as a coating that is bonded directly to a metal substrate.

In the method of producing the WC—Co coating according to the present invention, the WC—Co particles having a size (particle diameter) of 1 to 100 μm so that the composition thereof is within an intended range of 75 to 92% by mass of WC and 25 to 8% by mass of Co are accelerated to a rate of 500 m/s or higher by a high-speed gas stream, and are also heated to a temperature equal to or lower than the melting point using the warm spray process, and caused to collide continuously with the metal substrate, thereby forming a coating composed of WC and Co. At this stage, the Co binder phase within the coating is composed of an amorphous phase. Subsequently, the coating is held within a temperature range from 600 to 1,300° C. for 5 minutes or longer, and is then subjected to a heat treatment to be cooled to 300° C. or lower at a cooling rate of 3° C./min or higher. The above heat treatment is carried out in an inert atmosphere in order to prevent oxidation of the coating. The inert atmosphere can be an argon gas atmosphere or a helium gas atmosphere. Alternatively, it may be a mixed atmosphere of these gases. According to the heat treatment, it is possible to recrystallize the Co binder phase composed of an amorphous phase as a polycrystalline body composed of crystals having a face-centered cubic lattice structure.

In the above WC—Co coating, the ratio of (WC and Co) is preferably (75 to 92% by mass, and 25 to 8% by mass). This is because if the Co content becomes 25% by mass or greater, the coating becomes soft with a Vickers hardness of 1,000 Hv or lower and becomes unsuitable for use as a wear resistant hard coating which is the main application of the WC—Co coatings. When the WC content exceeds 92% by mass, the probability that the Co binder phase is present between the WC particles and the WC particles is lowered, and the deposition becomes difficult by a process to collide the solid phase particles without dissolving the particles. For this reason, it is desirable that the WC content be 92% by mass or less.

It is preferable to use particles of composite body of WC and Co (WC—Co particles) as a material.

The heating temperature of the WC—Co particles by the warm spray process is a temperature equal to or less than the melting point, and is preferably a temperature less than the melting point. In other words, it is equal to or less than the liquidus temperature corresponding to the quantitative ratio of WC and Co, and is preferably less than the liquidus temperature. The heating temperature of the WC—Co particles is equal to or less than the eutectic temperature of the WC—Co system, and is preferably less than the eutectic temperature. For example, a temperature equal to or less than 1,310° C., or a temperature less than 1,310° C. can be used. It is desirable that the heating temperature of the WC—Co particles be 787° C. or greater.

The heating treatment temperature of the coating is preferably within a range from 600° C. to 1,300° C., more preferably from 800° C. to 1,250° C., and still more preferably from 1,000° C. to 1,200° C. Since the temperature at which a brittle reaction phase is generated by the solid solution reaction of WC and Co is about 1,300° C. or higher, it is desirable that the heat treatment temperature be a temperature lower than 1,300° C. On the other hand, a temperature sufficiently higher than 500 to 600° C. which is the recrystallization temperature of Co can promote the recrystallization more rapidly.

The holding time of the heat treatment is preferably 5 minutes or longer, and more preferably 2 hours or longer, at a predetermined temperature. A certain amount of time is required for the disturbed atomic arrangement to be restored which is in an amorphous state when deposited. Especially in the low temperature side where the activity is low, the longer the holding time, the more stable the crystal structure becomes, and the uniformity of the structure is enhanced.

The cooling rate of the heat treatment is preferably 3° C./min or higher, and more preferably 10° C./min or higher. Although Co takes a hexagonal close-packed lattice structure at low temperatures, because the face-centered cubic lattice structure which is a high temperature phase is superior in ductility, the latter structure is desirable as the binder phase of the WC—Co coating. For this reason, it is effective to increase the cooling rate to some extent and suppress the change in the crystal structure from the face-centered cubic lattice to the hexagonal close-packed lattice at the time of cooling.

The material and shape of the substrate on which the coating is formed is not particularly limited.

As the metal substrate, for example, those illustrated in the above description can be used.

EXAMPLES

Deposition Apparatus

Figure 8:
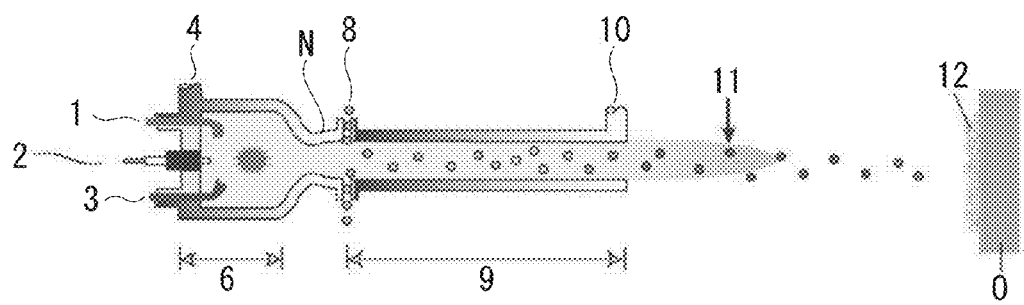
FIG. 8 is a schematic diagram showing a high velocity flame spraying apparatus and a thermal spraying process using the same.

FIG. 1 is a schematic diagram showing a configuration of a warm spray apparatus used in Examples and a deposition process using the same, and FIG. 8 is a schematic diagram showing a high velocity flame spraying apparatus used in Comparative Examples and a deposition process using the same.

In the apparatus shown in FIG. 8, a fuel and oxygen are supplied from a fuel inlet 1 and an oxygen inlet 3 to a combustion chamber 6, and ignited by an ignition plug 2. The combustion gas (combustion flame) becomes a high-speed gas when passing through a nozzle N. A raw material powder (raw material particles) is supplied from a raw material powder feeding section 8 to the combustion gas. The raw material powder is heated and accelerated while passing through a barrel 9, and becomes high-speed flying particles 11 and sprayed onto a metal substrate 0 and deposited to form a coating 12. It should be noted that the combustion chamber 6, the nozzle N, and the barrel 9 are cooled by the cooling water injected from an injection port 4 and discharged from a discharge port 10.

On the other hand, in the warm spray apparatus shown in FIG. 1, a mixing chamber 7 is provided between the combustion chamber 6 and the nozzle N. The fuel and oxygen supplied from the fuel inlet 1 and the oxygen inlet 3 to the combustion chamber 6 are ignited by the ignition plug 2 to form a combustion gas. An inert gas is supplied to the combustion gas from an inert gas inlet 5, and the combustion gas and the inert gas are mixed in the mixing chamber, thereby adjusting the gas temperature. The mixed gas becomes a high-speed gas when passing through the nozzle N. The raw material powder is supplied to the mixed gas from the raw material powder feeding section 8. The raw material powder is heated and accelerated while passing through the barrel 9 and becomes the flying particles 11 and sprayed onto the metal substrate 0 and deposited on the substrate to form the coating 12. The combustion chamber 6, the mixing chamber 7, the nozzle N, and the barrel 9 are cooled by the cooling water injected from the injection port 4 and discharged from the discharge port 10.

<Deposition and Heat Treatment of Coating>

In Example 1, a WC—Co powder (Co content: 25% by mass, particle diameter of WC contained in the powder particles: 0.2 μm, powder particle diameter: 5 to 20 μm) was deposited on a low carbon steel (JIS G3101 SS400) by the conditions indicated in Table 1 using the warm spray apparatus shown in FIG. 1. It is possible for the warm spray apparatus to heat the WC—Co particles to a temperature equal to or lower than the melting point without dissolving them, accelerate them to a supersonic speed, and cause them to collide with the substrate to thereby deposit.

In the conditions shown in Table 1, the spray distance indicates the distance between the edge of the barrel and the substrate, and the powder supply rate indicates the supply rate of the WC—Co raw material powder. Kerosene was used as a fuel, and nitrogen was used as a cooling gas in the warm spray process. Deposition was carried out while moving the apparatus (spray gun) in parallel with respect to the substrate at a traveling speed of 700 mm/s.

After deposition of the coating, first, in order to confirm the adhesion to the substrate, a portion of a sample was cut out and subjected to a cross sectional observation by an optical microscope. Then, a substrate portion was first removed from the obtained coating using a cutting machine and by polishing. Next, the coating was placed in a quartz tube, and after evacuating to attain a vacuum level of $10^{-7}$ mTorr, argon gas was introduced into the quartz tube, and the end of the quartz tube was burnt off and sealed with a burner. The pressure was adjusted so that the pressure of argon gas was one atmospheric pressure at the maximum holding temperature during the heat treatment.

TABLE 1

| Process name | Ex. 1-27 | Comp. Ex. 1-3 | Comp. Ex. 4-6 |
|---|---|---|---|
| | Warm spray process | Warm spray process | High velocity flame spraying process |
| Barrel length (mm) | 203 | 203 | 152 |
| Spray distance (mm) | 200 | 200 | 380 |
| Kerosene flow rate (L/min) | 0.38 | 0.38 | 0.38 |
| Oxygen flow rate (L/min) | 779 | 779 | 944 |
| Nitrogen flow rate (L/min) | 500 | 500 | 0 |
| Gun migration rate (mm/s) | 700 | 700 | 700 |
| Powder supply rate (g/min) | 87.5 | 87.5 | 87.5 |

The quartz tube encapsulating the coating was placed in a furnace, heated to 1,200° C. at a heating rate of 10° C./min, and after being held for 2 hours, cooled at an average cooling rate of 3° C./min and was taken out.

In Examples 2 to 27, the coatings with the Co content indicated in Table 2 were formed under the same conditions as in Example 1 by the warm spray process, and the coatings were encapsulated in a quartz tube in the same manner as in Example 1, and heat treatments were carried out at the holding temperatures/holding times/cooling rates indicated in Table 2.

In Comparative Examples 1 to 3, the coatings with the Co content indicated in Table 2 were formed by the warm spray process under the same conditions as in Example 1. No heat treatment was carried out.

In Comparative Examples 4 to 6, the WC—Co powder was used as a raw material and deposited on a low carbon steel (JIS G3101 SS400) by the conditions indicated in Table 1 using the high-velocity flame spraying apparatus shown in FIG. 8. No heat treatment was carried out.

TABLE 2

| Sample No. | Co content (% by mass) | Holding temperature (° C.) | Holding time (h) | Cooling rate (° C./min) | Fracture resistance Kc (MPa·m$^{1/2}$) |
|---|---|---|---|---|---|
| Ex. 2 | 12 | 800 | 2 | 3 | 3.3 |
| Ex. 3 | 12 | 800 | 4 | 3 | 2.7 |
| Ex. 4 | 12 | 800 | 8 | 3 | 2.7 |
| Ex. 5 | 12 | 1,000 | 2 | 3 | 4.0 |
| Ex. 6 | 12 | 1,100 | 2 | 3 | 2.6 |
| Ex. 7 | 12 | 1,100 | 4 | 3 | 5.8 |
| Ex. 8 | 12 | 1,100 | 8 | 3 | 5.7 |
| Ex. 9 | 12 | 1,200 | 2 | 3 | 6.2 |
| Ex. 10 | 12 | 1,200 | 4 | 3 | 5.5 |
| Ex. 11 | 12 | 1,200 | 8 | 3 | 4.9 |
| Ex. 12 | 17 | 800 | 2 | 3 | 8.4 |
| Ex. 13 | 17 | 1,000 | 2 | 3 | 8.6 |
| Ex. 14 | 17 | 1,100 | 2 | 3 | 8.2 |
| Ex. 15 | 17 | 1,200 | 2 | 3 | 7.0 |
| Ex. 16 | 25 | 800 | 2 | 3 | 9.0 |
| Ex. 17 | 25 | 800 | 4 | 3 | 10.7 |
| Ex. 18 | 25 | 800 | 8 | 3 | 10.7 |
| Ex. 19 | 25 | 1,000 | 2 | 3 | 17.6 |
| Ex. 20 | 25 | 1,000 | 4 | 3 | 8.0 |
| Ex. 21 | 25 | 1,000 | 8 | 3 | 11.6 |
| Ex. 22 | 25 | 1,100 | 2 | 3 | 11.3 |
| Ex. 23 | 25 | 1,100 | 4 | 3 | 12.7 |
| Ex. 24 | 25 | 1,100 | 8 | 3 | 11.2 |
| Ex. 1 | 25 | 1,200 | 2 | 3 | 16.9 |
| Ex. 25 | 25 | 1,200 | 4 | 3 | 12.3 |
| Ex. 26 | 25 | 1,200 | 8 | 3 | 19.9 |
| Ex. 27 | 25 | 1,200 | 2 | 20 | 12.4 |
| Comp. Ex. 1 | 12 | | | | 2.6 |
| Comp. Ex. 2 | 17 | | | | 4.5 |
| Comp. Ex. 3 | 25 | | | | 2.2 |
| Comp. Ex. 4 | 12 | | | | 5.5 |
| Comp. Ex. 5 | 17 | | | | 4.0 |
| Comp. Ex. 6 | 25 | | | | 3.6 |

Structure Observation

Example 1

The sample which was taken out in Example 1 after the heat treatment was subjected to a structure analysis using a transmission electron microscope.

Figure 2:
FIG. 2 is a cross-sectional photograph of a coating of Example 1 immediately after the deposition. A coating of Comparative Example 1 also has a similar cross section.
Figure 3:
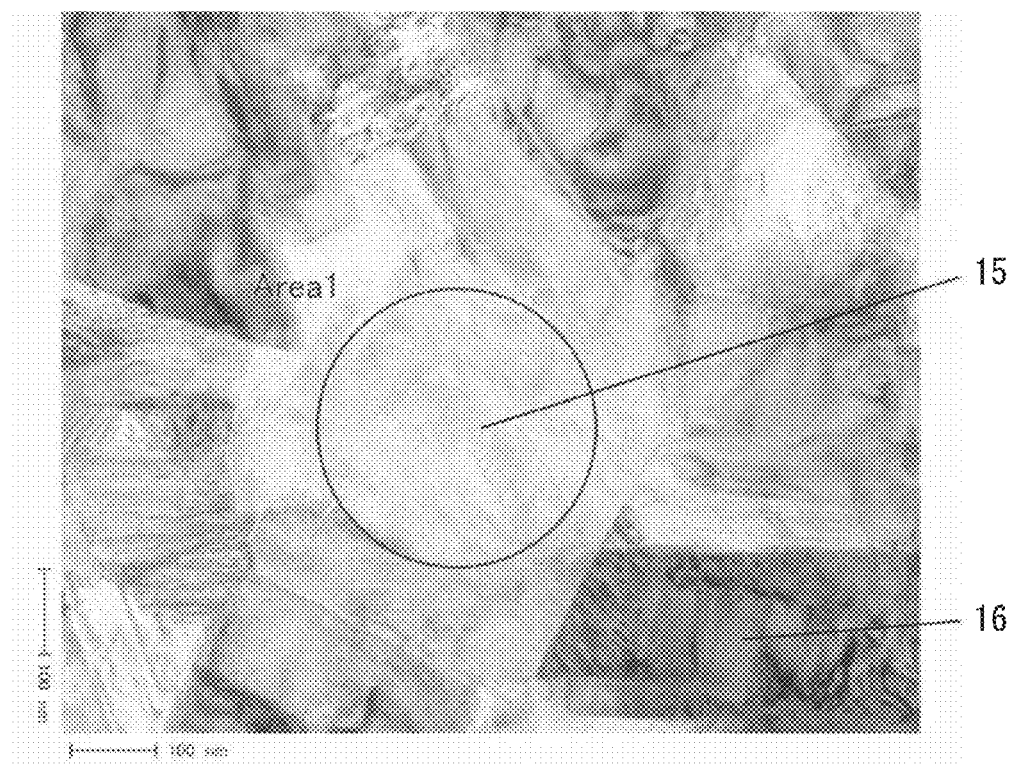
FIG. 3 is a structure photograph of the coating of Example 1 taken by a transmission electron microscope after a heat treatment.
Figure 4:
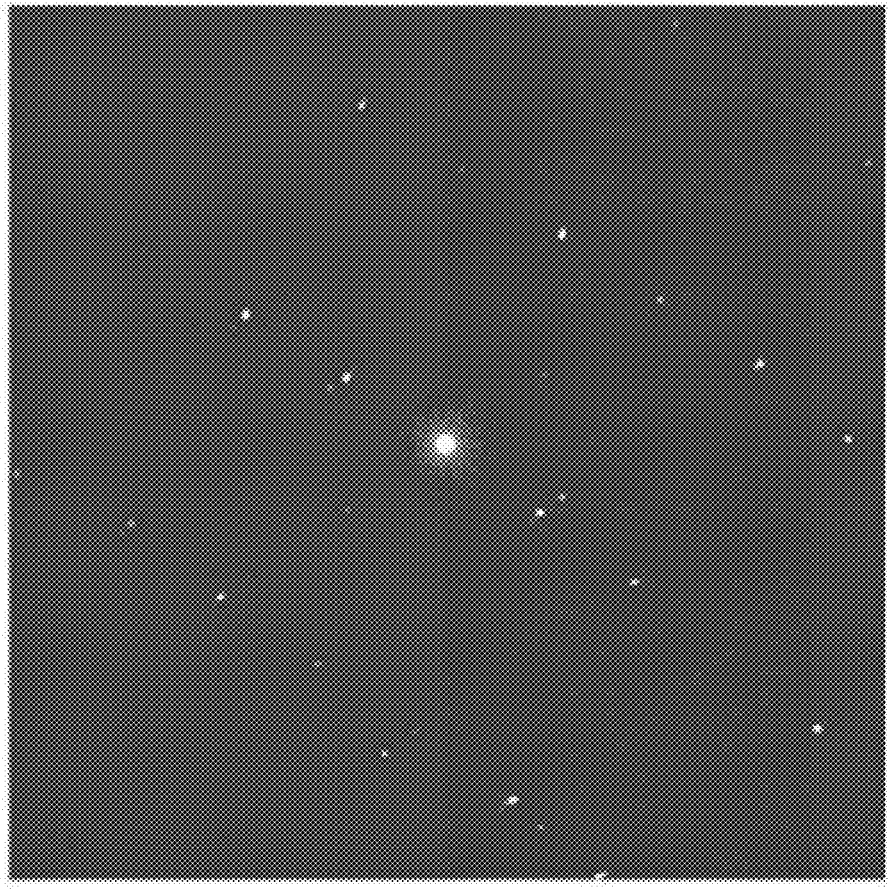
FIG. 4 is an electron beam diffraction image of a binder phase in an area surrounded by a circle in FIG. 3.
Figure 5:
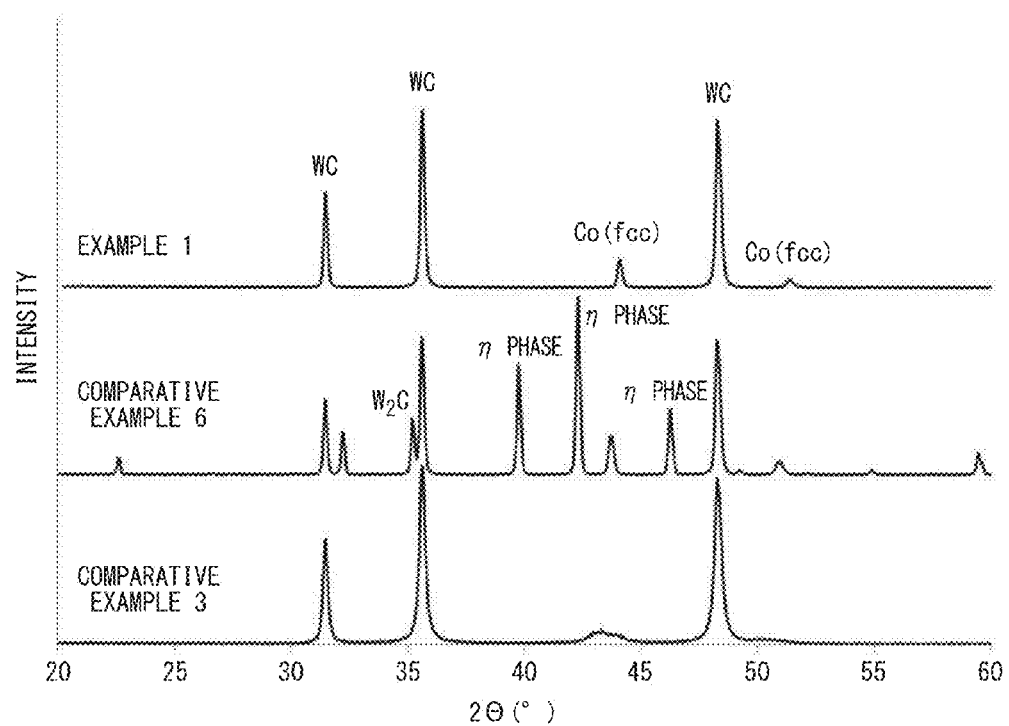
FIG. 5 shows results of X-ray crystal structure analyses in Example 1, Comparative Example 3 and Comparative Example 6.

FIG. 2 shows a cross-sectional photograph of the coating of Example 1 taken by an optical microscope. A coating 13 having a thickness of 400 µm is formed on a carbon steel substrate 14. The structure photograph taken by a transmission electron microscope is shown in FIG. 3. The coating is composed of WC and Co, and the Co portion is composed of a polycrystalline body (in the present figure and in FIGS. 6 and 10, WC is indicated by the reference numeral 15 and Co is indicated by the reference numeral 16). FIG. 4 shows an electron beam diffraction image (selected area electron beam diffraction image) of the Co crystals in an area indicated by a circle in FIG. 3 (Area1). The diffraction pattern due to the crystal structure is confirmed, which indicates that the Co phase is a polycrystalline body. Further, the results of crystal structure analyses by X-ray are shown in FIG. 5. In Example 1, the coating is formed only of WC and Co, and it is clear that Co has a face-centered cubic lattice structure which is indicated as fcc in the figure.

Comparative Example 3

A coating of Comparative Example 3 which was formed by the same conditions as in Example 1 and which was not subjected to a heat treatment was also subjected to a structural analysis by transmission electron microscopy and X-ray structural analysis.

Figure 6:
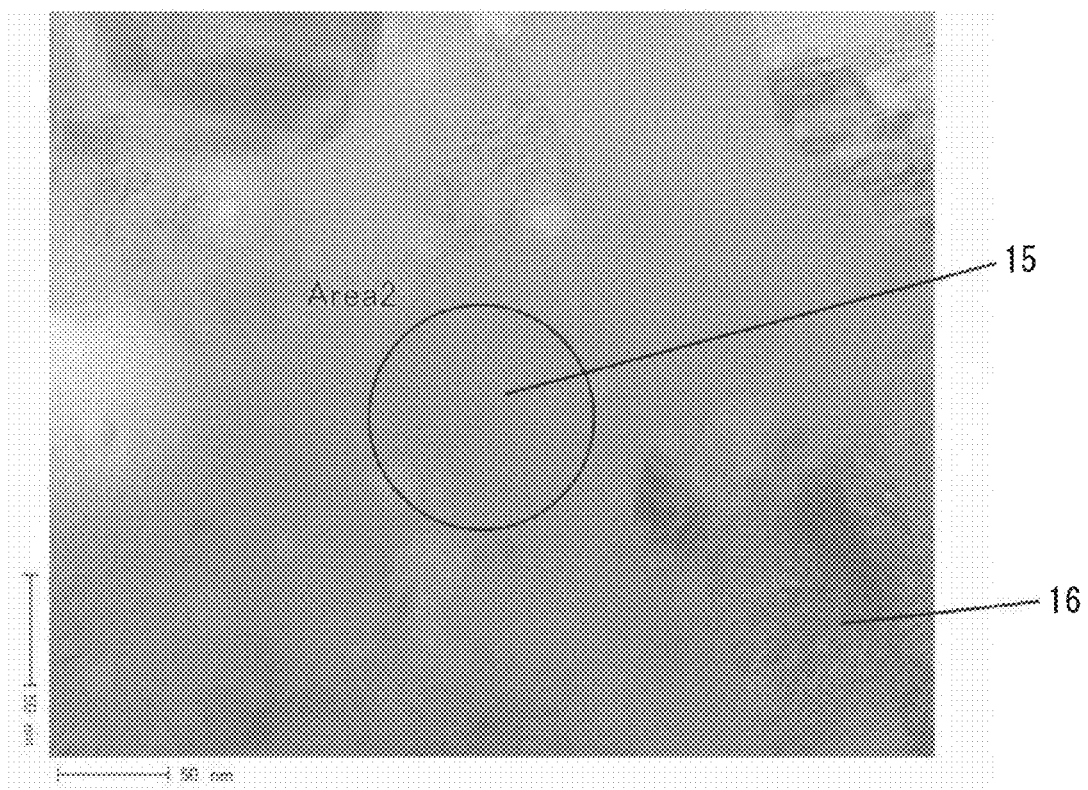
FIG. 6 is a structure photograph of a coating of Comparative Example 1 taken by a transmission electron microscope.
Figure 7:
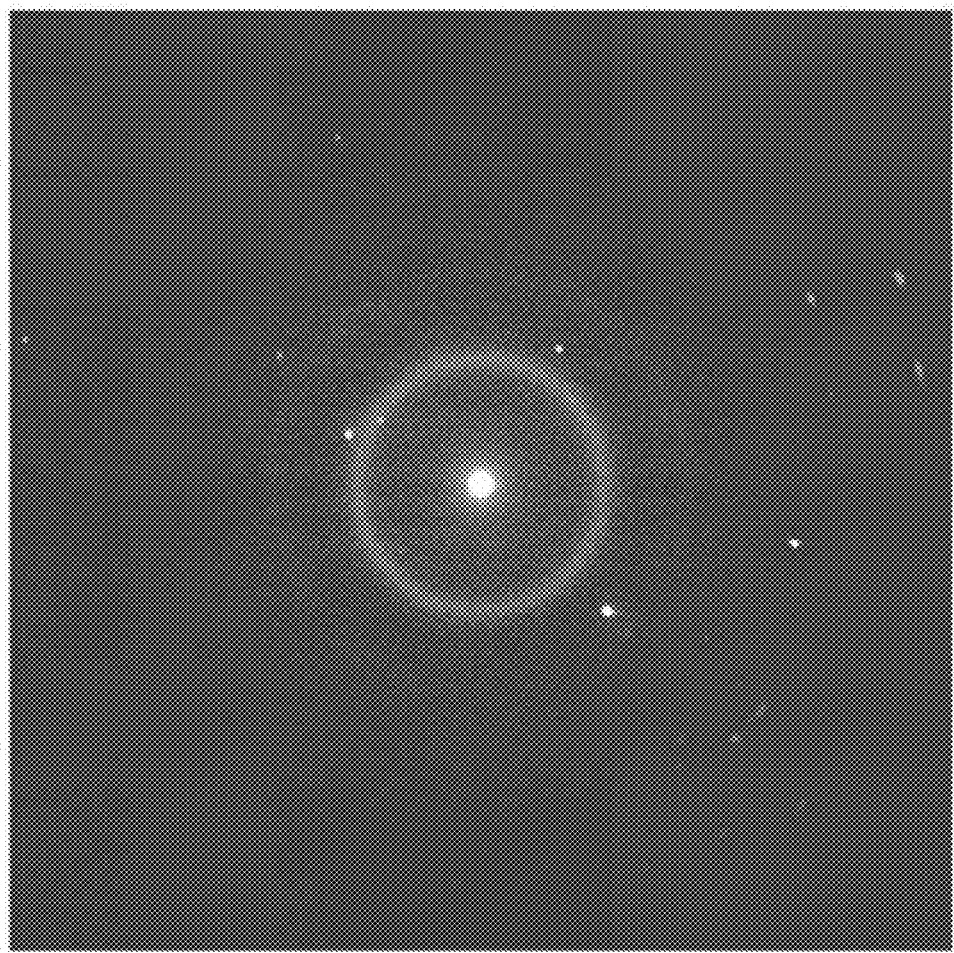
FIG. 7 is an electron beam diffraction image of a binder phase in an area surrounded by a circle in FIG. 6.

FIG. 6 shows a structure photograph taken by a transmission electron microscope. Although the coating of Comparative Example 3 was also composed of WC and Co, unlike Example 1, no crystal structure was observed in the Co portion. Further, numerous pores indicated by bright and small circular spots are present. FIG. 7 shows an electron beam diffraction image (selected area electron beam diffraction image) of an area in the Co portion indicated by a circle in FIG. 6 (Area2). A clear halo ring was observed, which indicates that the Co portion is in an amorphous state where the crystal structure is significantly disordered, and is not a polycrystalline body. Although the result of an X-ray structural analysis of Comparative Example 3 is shown in FIG. 5, since the Co portion is amorphous, the Co peak close to 44° is broad, as compared with that in Example 1, and the peak close to 51° which indicates a face-centered cubic structure is not observed.

Comparative Example 4

A coating of Comparative Example 4 which was formed using a high velocity flame spraying apparatus was subjected to a heat treatment in the same manner as in Example 1, and then a structural analysis by transmission electron microscopy was carried out.

Figure 9:
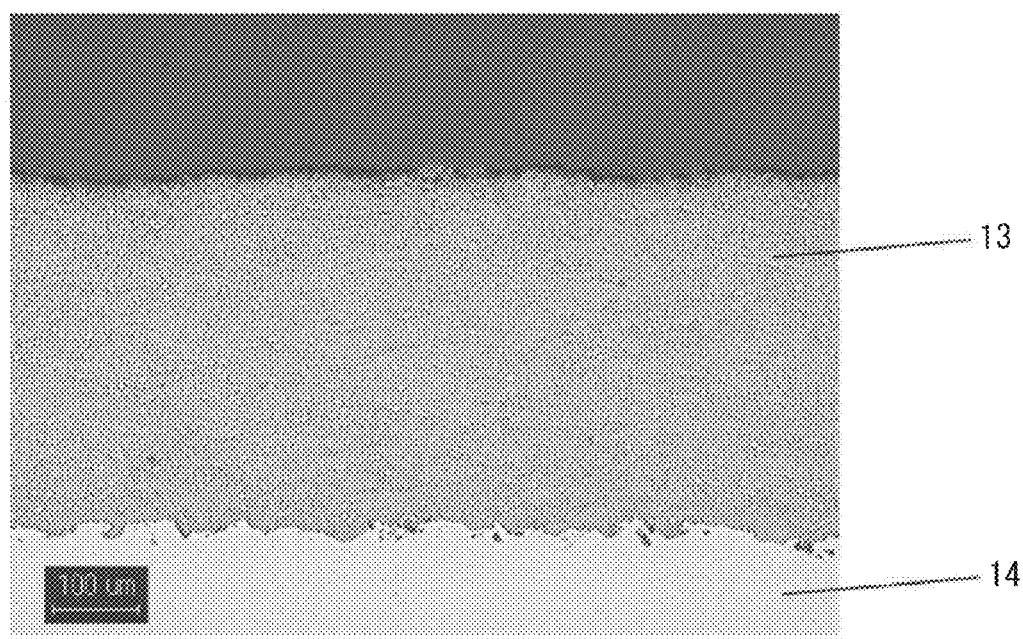
FIG. 9 is a cross-sectional photograph of a coating of Comparative Example 2 immediately after the deposition.
Figure 10:
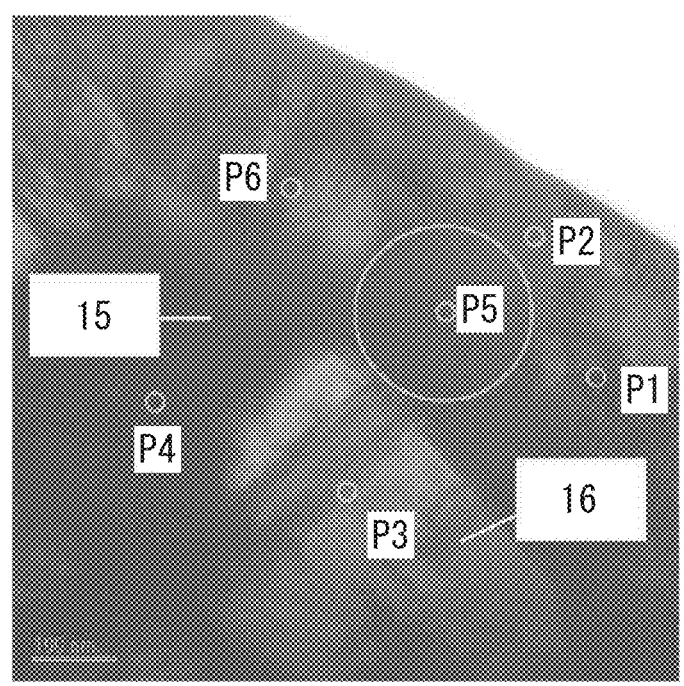
FIG. 10 is a structure photograph of the coating of Comparative Example 2 taken by a transmission electron microscope.
Figure 11:
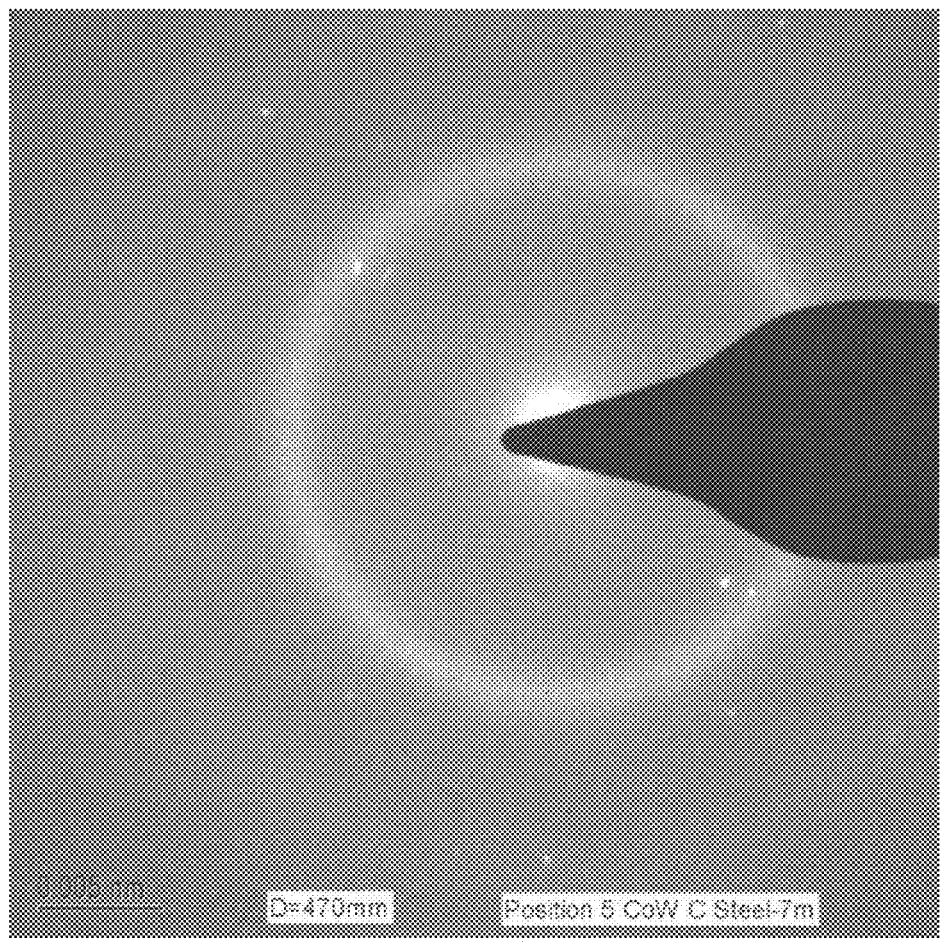
FIG. 11 is an electron beam diffraction image of a binder phase surrounded by a circle in FIG. 10.

FIG. 9 shows a cross-sectional photograph of the coating taken by an optical microscope. FIG. 10 shows a structural photograph taken by a transmission electron microscope. Although the coating of Comparative Example 4 was also made of a binder phase mainly composed of WC and Co, unlike Example 1, no crystal structure was observed in the Co portion. Small circles (indicated by reference symbols P1 to P6 in the neighborhood) in the figure indicated the positions of beam spots of the electron beam diffraction, respectively. The electron beam diffraction image (selected area electron beam diffraction image) of the Co portion which was collected at the spot position P5 by restricting the field of view within the range indicated by a large circle in the figure is shown in FIG. 11. The diffraction image is showing a clear halo ring, which indicates that the Co portion has an amorphous structure and is not a polycrystalline body. Similarly, halo rings were observed at P2 and P4. On the other hand, diffraction patterns were observed at the spot positions P2, P3 and P6. Although the result of an X-ray structure analysis of Comparative Example 4 is shown in FIG. 5, since in the high velocity flame spraying, the powder is melted and sprayed to carry out the deposition, an η phase which is an alloy phase of (Co, W, C) is deposited, and the structure is not composed of two phases of WC and Co.

<Fracture Resistance Test>

For the coatings of Examples 1 to 27 and the coatings of Comparative Examples 1 to 6, Vickers indenters were hammered into the coating cross section with a load of 10 kg, and the fracture resistance was determined from the length of the cracks generated. The obtained values are shown in Table 2. When the coatings of Examples 1 to 27 and Comparative Examples 1 to 6 that are produced using the same process are compared, it can be seen that the fracture resistance is improved by the heat treatment in all cases. In the coatings having a high Co content of 17 and 25% by mass of Co (Examples 12 to 27), the fracture resistance is dramatically improved in all Examples, as compared with Comparative Examples 1 to 6. In the coatings having a low Co content of 12% by mass of Co (Examples 1 to 11), although the improvement in the fracture resistance cannot be observed as compared with Comparative Examples 1 to 6 when the holding temperature is low, the improvement in the fracture resistance can be observed by increasing the holding temperature.

INDUSTRIAL APPLICABILITY

By using the cermet coating of the present invention, application to the drills, chips and blades for cutting and processing woods and metals can be expected where conventional cermet coating was difficult to use due to the occurrence of detachment and chipping. In addition, further applications to various large industrial machines, for example, as a wear resistant coating in a paper-making roll or a steel-making roll can also be expected. Furthermore, it is considered that the coating of the present invention is also useful in improving the durability of structure steel that constitutes a bridge.

The invention claimed is:

1. A cermet coating comprising:
a hard phase; and
a binder phase that binds said hard phase,
wherein said cermet coating is bonded directly to a metal substrate;
said hard phase comprises a carbide phase composed of at least one type of WC and CrC; and
said binder phase includes at least one type of metal phase selected from Co, Ni, NiCr, and CoCr, and has a structure of a metal polycrystalline body.

2. The cermet coating according to claim 1,
wherein said hard phase comprises WC;
said binder phase comprises Co;
WC and Co are incorporated so that a ratio of WC is from 75 to 92% by mass and a ratio of Co is from 25 to 8% by mass;
a WC particle diameter is from 50 to 5,000 nm;
a Co phase is a polycrystalline body composed of crystals having a crystal grain size of 50 to 1,000 nm and a face-centered cubic lattice structure;
the coating is a thin film having a thickness of 20 to 1,000 μm; and
a porosity within the coating is not more than 1% by volume.

3. A coated metal body comprising: a metal base; and
a coating formed on at least a portion of a surface of said metal base,
wherein said coating includes the cermet coating described in claim 1 and
said cermet coating is bonded directly to at least a portion of the surface of said metal base.

4. A method of producing a cermet coating, the method comprising:
a step of forming, on a metal substrate, a precursor coating including a carbide phase and an amorphous binder phase composed of a metal phase by accelerating composite particles of said carbide phase and said metal phase to a rate of 500 m/s or higher by a gas stream and also heating to a temperature equal to or below the melting point, using a warm spray process, thereby causing said composite particles to collide with said metal substrate in a continuous manner; and
a step of recrystallizing said metal phase into a polycrystalline body by heat treating said precursor coating in an inert atmosphere composed of at least one type of argon and helium,
wherein said carbide phase comprises one or two types of WC and CrC, and
said metal phase comprises at least one type selected from Co, Ni, NiCr, and CoCr.

5. The method of producing a cermet coating according to claim 4,
wherein said carbide phase comprises WC;
said metal phase comprises Co;
said composite particles are WC—Co particles having a composition within a range so that a ratio of WC is from 75 to 92% by mass and a ratio of Co is from 25 to 8% by mass, and having a particle diameter of 1 to 100 μm; and
in said heat treatment step, said precursor coating is held for 5 minutes or more at a temperature range from 600 to 1,300° C., and is then cooled to 300° C. or less at a cooling rate of 3° C./min or more, to thereby form a cermet coating composed of WC—Co having a polycrystalline body of Co crystals with a face-centered cubic structure as a binder phase.

6. A method of producing a coated metal body, the method comprising: a step of forming a cermet coating bonded directly to at least a portion of a surface of a metal base using said metal base as a metal substrate by the method described in claim 4.

7. The method according to claim 4, wherein said temperature of the heat treatment step is equal to or greater than the lower limit of the temperature at which recrystallization of the metal phase occurs; and the heating temperature is less than the temperature at which the solid solution reaction between the carbide (hard phase) and the metal binder phase occurs.

* * * * *